UNITED STATES PATENT OFFICE.

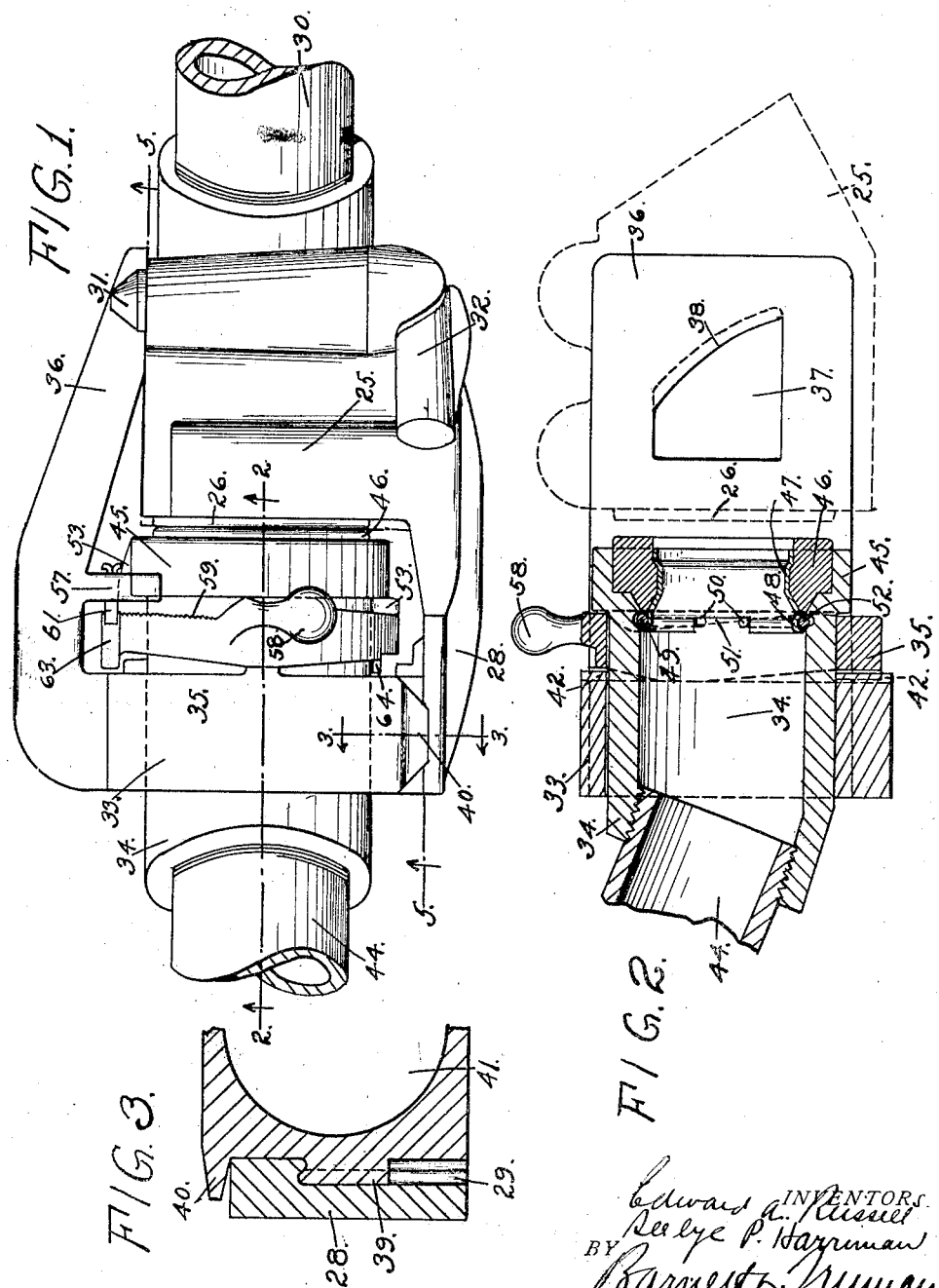

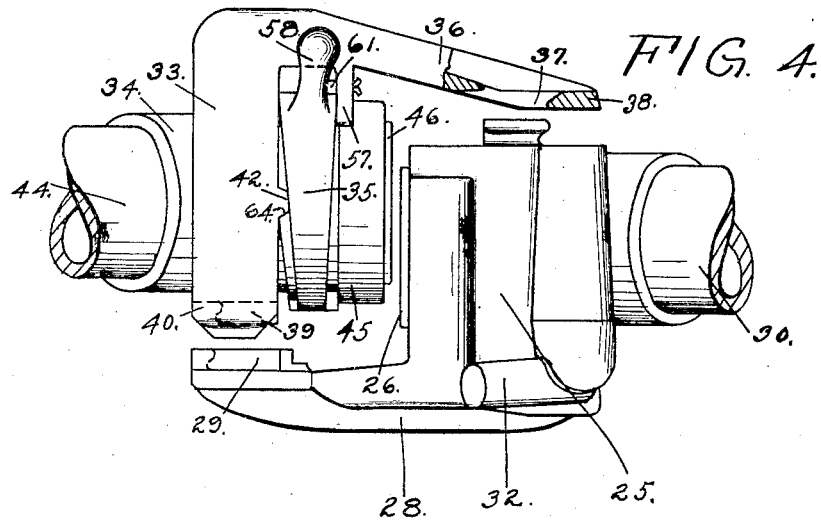
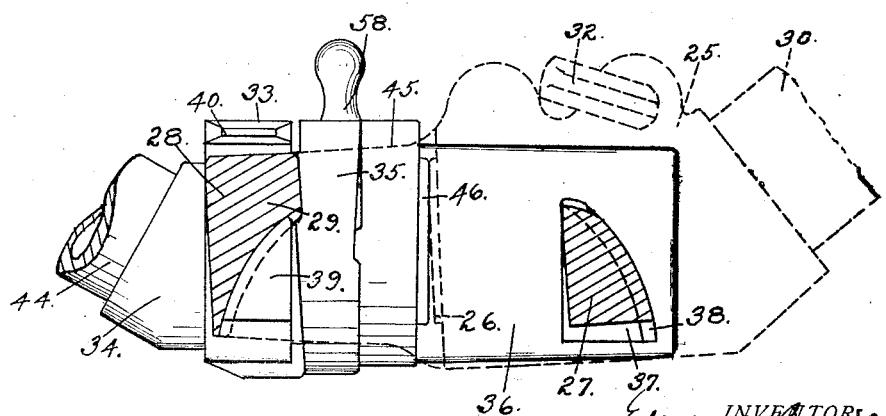

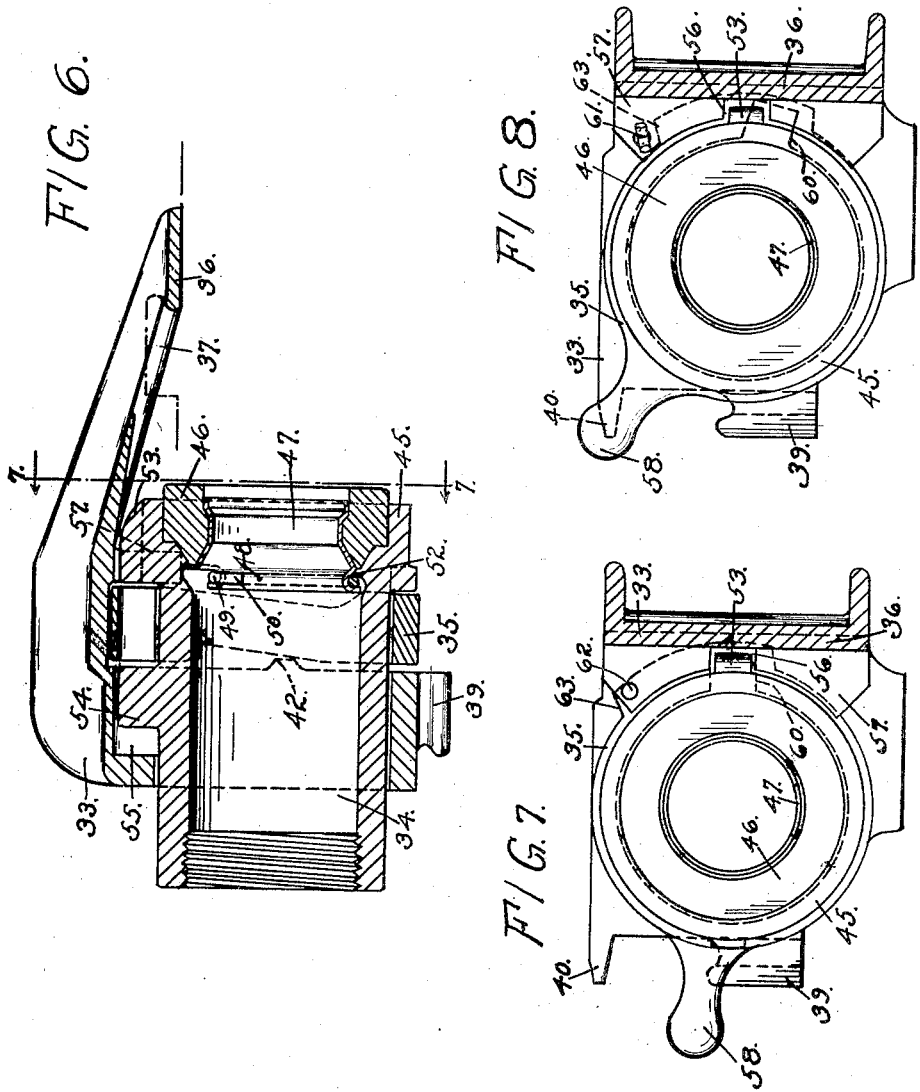

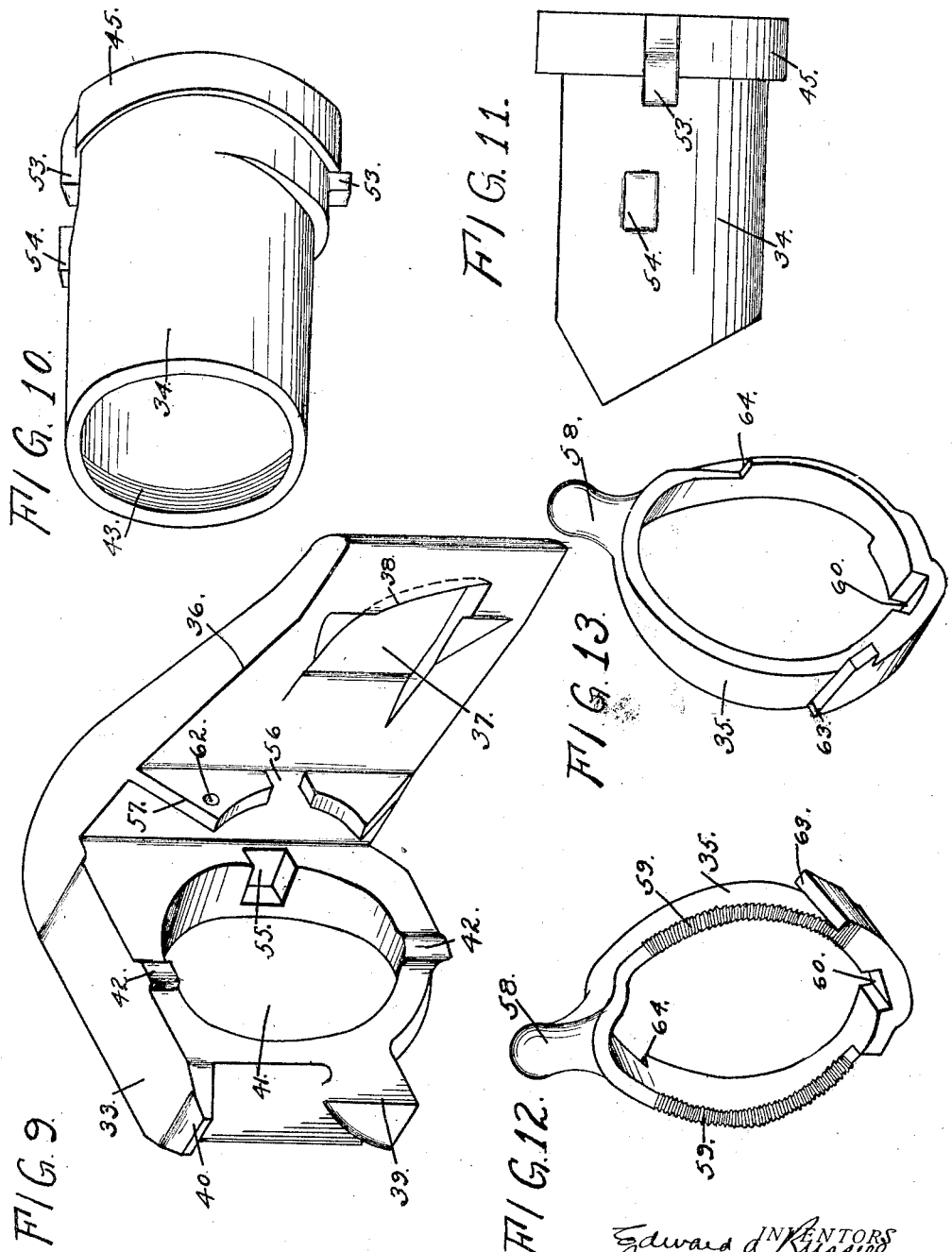

EDWARD A. RUSSELL AND SEELYE P. HARRIMAN, OF CHICAGO, ILLINOIS, ASSIGNORS, BY MESNE ASSIGNMENTS, TO ROTH MANUFACTURING COMPANY, OF CHICAGO, ILLINOIS, A CORPORATION OF ILLINOIS.

HOSE-COUPLING.

1,346,422.   Specification of Letters Patent.   Patented July 13, 1920.

Original application filed January 24, 1916. Serial No. 73,885. Divided and this application filed July 24, 1916. Serial No. 110,873.

*To all whom it may concern:*

Be it known that we, EDWARD A. RUSSELL and SEELYE P. HARRIMAN, citizens of the United States, residing at Chicago, in the county of Cook and State of Illinois, have invented certain new and useful Improvements in Hose-Couplings, of which the following is a specification.

Our invention relates to hose couplings, particularly to couplings for connecting the hoses or equivalent elements in the steam train lines on railway cars.

The principal object of the invention is to provide certain improvements upon the type of hose coupling shown in our copending application Serial No. 73,885, filed January 24, 1916, for hose coupling whereby the hose coupling is simplified and the cost of manufacture thereof reduced. The present invention also provides a lighter, more compact coupling, which is a matter of considerable importance, and one which is operated more conveniently.

The invention is illustrated in a preferred embodiment in the accompanying drawings wherein—

Figure 1 is a plan view of a coupler embodying the principles of our invention shown as connected with a coupler member of the type heretofore in use on railroads.

Fig. 2 is a longitudinal, sectional view on line 2—2 of Fig. 1.

Fig. 3 is a fragmentary sectional view on line 3—3 of Fig. 1.

Fig. 4 is a plan view of the coupler heads shown in the preceding figures illustrating the manner in which the coupling cams are brought into engagement.

Fig. 5 is a sectional view on line 5—5 of Fig. 1, but indicating the position of the coupler heads after the cams have been engaged but before the one gasket has been brought into contact with the other.

Fig. 6 is a longitudinal sectional view of the improved coupler shown in the preceding figures, but illustrating the parts in the position which they take while being assembled.

Fig. 7 is a sectional elevation on line 7—7 of Fig. 6.

Fig. 8 is a similar view, but showing the parts in their operative position.

Fig. 9 is a view in perspective of what will be termed the coupling member of the coupler.

Fig. 10 a similar view of the gasket holding or conduit member.

Fig. 11 a side view of the last named member.

Figs. 12 and 13 views in perspective of the cam ring for effecting a relative longitudinal movement as between the conduit member and the coupling member.

Like characters of reference indicate like parts in the several figures of the drawings.

Referring to the drawings, 25 designates a coupler of the Sewall type commonly used on railroads at the present time. 26 is the gasket of the coupler which has a fixed relation with the coupler head 25. 27 is an arcuate cam lug on one side of the coupler head, and 28 an arm projecting from the other side of the coupler head provided with an under-cut cam lug 29 adapted to engage with a cam lug on the mating coupler head corresponding to lug 27. 30 is the nipple to which the hose (not shown) is attached. The coupler is shown as provided with a locking pin 31 manipulated by handle 32. A coupler of this type is disclosed in Letters Patent No. 1,118,123 granted to Egbert H. Gold on November 24, 1914.

It will be understood that the coupler of the type just described is coupled with its mating coupler by rocking the two devices in a vertical plane so that the extremities of their interlocking arms are tilted upwardly, bringing the gaskets together at the lowermost points on their meeting faces and then rocking the couplers downwardly toward each other, so that the interlocking cam lugs will engage with each other and the coupler heads be brought to a horizontal position, in which they are held by gravity assisted, ordinarily, by some form of lock such as the lock pin 31 described. The operation is reversed when the devices are uncoupled. These rocking movements bend the rubber hose which, being made quite heavy at the present time, are likely soon to become cracked or worn at the places where they are flexed. Besides this, the fulcrum of the rocking movements is, as stated, at the lower edges of the gaskets. This tends to crush or otherwise injure the gaskets at these points so that the life of the gasket of a gravity type coupler is short. There is another objection to the gravity or Sewall type of coupler. In order that the joint between the couplers be steam-tight, it is necessary that the mating faces of the gaskets be pressed together accurately and with some force. This is intended to be brought about through expansibility of the gaskets. As a matter of fact, the gaskets sometimes shrink after being subjected to pressure and the temperature of steam and are sometimes made originally shorter than they should be. As a result of either condition the coupling will leak and waste steam. Furthermore, to obtain any considerable amount of longitudinal expansion at the temperature of steam, it is necessary to make the gaskets relatively long, which is an item of expense, as the Jenkins material and the other similar compounds from which the gaskets are made are relatively expensive.

The coupler of our invention, which is shown at the left hand side of Figs. 1, 2, 4 and 5 and in detail in the other figures of the drawings, while capable of mating with every style of gravity straight port coupler in use on railroads, has none of the disadvantages, above noted, of the ordinary gravity coupler.

Instead of employing a coupler head consisting of a single rigid coupler with which the gasket has a fixed relation, the device of our invention consists of what may be termed a coupling member 33, a gasket holding or conduit member 34, movable with relation to the coupling member, and means, preferably a cam ring 35, for effecting a relative longitudinal movement as between the conduit member and the coupling member. The coupling member 33 is formed preferably with the usual locking arm 36 which may be provided with an undercut locking cam similar to the locking cam 29 above described but which preferably is formed with an opening 37 bounded on one side by an arcuate beveled edge 38. On the other side of the coupling member is a cam lug 39 corresponding to the cam lug 27 of coupler head 25. Above cam lug 39 is a lateral projection 40. The coupling member has a circular opening 41 for the conduit member 34 and is provided on its face adjacent cam ring 35 with diametrically arranged projections 42 for the cam ring to bear against.

The conduit member 34 has its inner extremity bent up and threaded at 43 for the hose nipple 44. The other end is provided, preferably, with a boss or enlargement 45 in which is arranged a gasket holder 46 which may be kept in place in any suitable manner. We have shown the gasket as provided with an interior metal annulus 47 formed with a grooved portion 48 to receive a spring locking ring 49, the extremities 50 of which project through an opening 51 in the grooved portion of the annulus. The locking ring 49 lies against an interior shoulder 52 on the conduit member 34 but can be contracted by pressing its extremities 50 together so as to clear the shoulder and allow the removal of the gasket. The conduit member is provided with diametrically arranged projections 53 against which cam ring 35 is adapted to bear, and is also formed with a lug 54 which stands on the opposite side of the cam ring from projections 53 when the parts of the coupler are assembled. The lug 54 fits into a recess 55 formed in the coupling member and one of the projections 53 in the slot 56 formed in a projecting web 57 on the locking arm 36. The contour of the cam ring 35 is such that when in operative position and given a partial rotation by means of handle 58, it produces a relative longitudinal movement between the conduit member and the coupling member, the projections 53 being arranged at approximately ninety degreees from projections 42 so that the conduit or gasket holding member has a certain capacity for angular self-adjustment to insure proper contact between gasket 46 and the gasket of the mating coupler. To insure better frictional engagement between the parts of the coupler the cam ring is preferably formed with serrated surfaces 59. The cam ring is formed with an interior recess or transverse groove 60 and the parts of the coupler are assembled by placing the ring between the top portion of the coupling member and its web 57 with groove 60 in alinement with groove 56, which is a little out of alinement with recess 55, and thrusting the small or bent end of the conduit member through the ring and coupling member until lug 54 passes through slot 56 into groove 60 in the ring, when the ring and conduit member are turned a trifle until lug 54 alines with recess 55 and the projection 53 adjacent lug 54 with slot 56. The conduit member may then be pushed the rest of the way through the ring and coupling member.

Figs. 6 and 7 show the parts in the positions just described. To prevent disengagement the ring is rotated from this position to the position shown in Fig. 8 and stop pin 61 is inserted in the perforation 62 in web 57 so as to form a stop abutment for a shoulder 63 formed on the ring. Movement of the ring in the opposite direction is limited by a shoulder 64 which abuts against the upper projection 42 of the coupling member.

Operation: When the coupler of our invention is to be coupled up with another coupler, for example, with gravity type coupler 25, the two couplers are brought together by a sidewise movement of one toward the other without rocking either one of them, their axes, in other words, remaining during the movement substantially parallel, cam 38 passing over the cam lug 27 and cam 29 similarly passing over cam 39. The actuating cam ring 35 will, of course, be turned in such position as to retract the conduit member 34 as far as need be. Fig. 4 shows the manner in which the couplers are brought one against the other as just described. As soon as the interlocking cams 38, 27 and 29, 39 are brought into alinement with each other, the coupler heads may be released, with the result that the cams will engage, bringing the gaskets 28, 46 together at the top, as indicated in Fig. 5. If the improved coupler of our present invention be mated with another of the same construction, the gaskets will not ordinarily touch at all until the conduit members are moved forward. This movement is effected by partially rotating the cam ring 35. Either or both cam rings may be so rotated in case the coupling of our invention is mated with one of the same construction. The gaskets in this way will be forced one against the other and the rotation of the cam ring may be continued until the gaskets are pressed against each other as tightly as may be necessary in order to make a perfectly steam-tight joint. The advantage of forming the locking arm 36 with the opening 37 for the cam lug of the other coupler instead of forming it with the usual undercut cam projection is that the abutment thereby provided for the straight edge or edges of the cam lug tends to prevent the rocking of one coupler with respect to the other before the gaskets are in contact or while they are being forced one against the other. It will be seen that a little variation in the length of the gasket which, in ordinary couplers, will result either in a leaky joint or in injury to the gaskets, is a matter of no consequence in the coupler of our invention. Moreover, as it is not necessary to rely upon the expansibility of the gaskets to insure a steam-tight joint, an economy can be effected by using short gaskets. The cam ring operates between two diametrically opposite projections on the coupling member and two like projections on the conduit member which are arranged at approximately ninety degrees from the first named pair of projections. This gives the conduit member capacity for rocking a little in any direction necessary to insure an accurate seating of the gasket faces one against the other. The provision of the coupling member with the lateral projection 40 is important. This projection prevents the arm of the other coupler from being forced up on cam lug 39 when longitudinal pressure is exerted through rotation of cam ring 35. If the cam on the locking arm engaging cam lug 39 accurately fits cam lug 39, there is little danger of any slip between the two interlocking cams. But the cams of the various makes of couplers in use on railroads, are not always uniform in their contours. If there is only a point engagement between the pair of co-engaging cams, the pressure produced by the thrust of the cam ring is likely to produce a slip which, were it not checked by projection 40, would make the interlock between the couplers insecure. While the device of our invention has no supplemental lock, and is simplified thereby, the operation of the cam ring, particularly when its edges are serrated, as shown, to increase friction, taken in conjunction with the arrangement of the stop lug 40 above the arm of the mating coupler head, is to effectively and positively lock the mating couplers together.

The coupler of our invention is very light and is not expensive to manufacture. It has all of the advantages possessed by the Sewall or gravity type straight port coupler, except the capacity for automatically uncoupling, and this is a feature which is regarded with little favor by railroads, as is shown by the recent practice, which is becoming more common, of providing couplers with positive supplemental locks.

While we have described our invention in a preferred embodiment, it will be understood that modifications might be made without departure from the principles of the invention. Therefore, we do not wish to be understood as limiting the invention to the precise arrangements, constructions and devices shown and described except so far as certain of the claims herein are specifically so limited.

We claim:

1. A hose coupler comprising a coupling member adapted to mate with a coupler of the Sewall type, a conduit member movable with respect to the coupling member, and a cam positioned adjacent the outer face of the coupling member surrounding the conduit member and engaging with said members so that its rotation in one direction produces relative movements between said members whereby the conduit member is seated against the corresponding part of the mating coupler while its rotation in the opposite direction withdraws said conduit member from operative contact with said mating coupler.

2. A hose coupler comprising a coupling member adapted to mate with a coupler of the Sewall type, a conduit member movable with respect to said coupling member, and a cam ring positioned adjacent the outer face of the coupling member surrounding said conduit member and bearing on opposite sides against parts thereof and against said coupling member so that its rotation produces relative longitudinal movements between said members in opposite directions.

3. A hose coupler comprising a coupling member adapted to mate with a coupler of the Sewall type, a conduit member extending through said coupling member and formed with an enlargement at its outer end, and a cam ring surrounding said conduit member and interposed between the enlargement thereof and said coupling member.

4. A hose coupler comprising a coupling member adapted to mate with a coupler of the Sewall type, a conduit member which extends through said coupling member and is provided at its outer end with a pair of diametrically arranged lugs, a pair of diametrically arranged lugs on the coupling member at substantially right angles to the lugs of the conduit member, and a cam member interposed between said lugs.

5. A hose coupler comprising a coupling member adapted to mate with a coupler of the Sewall type, a conduit member which extends through said coupling member and is provided at its outer end with a pair of diametrically arranged lugs, a pair of diametrically arranged lugs on the coupling member at substantially right angles to the lugs of the conduit member, and a cam ring surrounding said conduit member and interposed between said pairs of lugs.

6. A hose coupler comprising a coupling member, adapted to mate with a coupler of the Sewall type, a conduit member movable with respect to said coupling member, and means for effecting a relative movement as between said members, which seats said conduit member against the corresponding part of the mating coupler, and a lateral projection on said coupling member adapted to stand over the locking arm of the mating coupler.

7. A hose coupler comprising a coupling member adapted to mate with a coupler of the Sewall type, a conduit member adapted to extend and be movable longitudinally through the coupling member and formed with an enlargement at the outer end for holding a gasket, a cam ring which surrounds said conduit member and bears against said enlargement, a lug on the conduit member which stands on the other side of the cam ring from said enlargement, and a web on the coupling member which stands in front of the cam ring.

8. A hose coupler comprising a coupling member adapted to mate with a coupler of the Sewall type, a conduit member adapted to extend and be movable longitudinally through the coupling member and formed with an enlargement at the outer end for holding a gasket, a cam ring which surrounds said conduit member and bears against said enlargement, a lug on the conduit member which stands on the other side of the cam ring from said enlargement, and a web on the coupling member which stands in front of the cam ring, said ring and web being slotted to permit the lug on the conduit member to pass said web and ring in assembling.

9. A hose coupler comprising a coupling member adapted to mate with a coupler of the Sewall type, a conduit member adapted to extend and be movable longitudinally through the coupling member and formed with an enlargement at the outer end for holding a gasket, a cam ring which surrounds said conduit member and bears against said enlargement, a lug on the conduit member which stands on the other side of the cam ring from said enlargement, and a web on the coupling member which stands in front of the cam ring, said ring and web being slotted to permit the lug on the conduit member to pass said web and ring in assembling, the coupling member being formed with a recess to receive said lug.

10. A hose coupler comprising a coupling member adapted to mate with a coupler of the Sewall type, a conduit member adapted to extend and be movable longitudinally through the coupling member and formed with an enlargement at the outer end for holding a gasket, a cam ring which surrounds said conduit member and bears against said enlargement, a lug on the conduit member which stands on the other side of the cam ring from said enlargement, a web on the coupling member which stands in front of the cam ring, said ring and web being slotted to permit the lug on the conduit member to pass said web and ring in assembling, and stop members on the cam ring and web, the one on the latter being removable, to keep the slot in the ring out of alinement with the slot in the web.

11. A hose coupler comprising a coupling member adapted to engage with a coupler of the Sewall type, provided with a circular opening and formed with diametrically arranged lugs on its outer face, a conduit member adapted to project through the opening in the coupling member and formed with diametrically arranged lugs which stand at substantially right angles to the lugs on the coupler member, a cam ring surrounding said conduit member and interposed between the same and the outer face of the coupling member, a lug on the conduit member which stands on the opposite side of the cam ring from the other lugs on the conduit member, said coupling member being formed with a recess to receive said last mentioned lug, and a web on the coupling member which stands in front of the cam ring, said web and cam ring being formed with slots to permit said last mentioned lug and the lug adjacent thereto on the conduit member to pass the web and ring when the parts of the device are assembled.

12. A hose coupler comprising a coupling member adapted to engage with a coupler of the Sewall type, provided with a circular opening and formed with diametrically arranged lugs on its outer face, a conduit member adapted to project through the opening in the coupling member and formed with diametrically arranged lugs which stand at substantially right angles to the lugs on the coupler member, a cam ring surrounding said conduit member and interposed between the same and the outer face of the coupling member, a lug on the conduit member which stands on the opposite side of the cam ring from the other lugs on the conduit member, said coupling member being formed with a recess to receive said last mentioned lug, and a web on the coupling member which stands in front of the cam ring, said web and cam ring being formed with slots to permit said last mentioned lug and the lug adjacent thereto on the conduit member to pass the web and ring when the parts of the device are assembled, said cam ring and web being provided with co-engaging stops, that of the web being removable, to limit the angular movement of the cam ring.

13. A hose coupler comprising a coupling member provided on one side with a lateral projection and on the other with a forwardly extending arm adapted to engage a mating coupler; a conduit member movable with respect to the coupling member, and a cam positioned adjacent the outer face of the coupling member surrounding the conduit member and engaging with said members so that a rotation of the cam in one direction produces relative movement between said members whereby the conduit member is seated against the corresponding part of the mating coupler while its rotation in the opposite direction withdraws said conduit member from operative contact with said mating coupler.

14. A hose coupler comprising a coupling member provided on one side with a lateral projection and on the other with a forwardly extending arm adapted to engage a mating coupler, a conduit member movable with respect to said coupling member, and a cam ring positioned adjacent the outer face of the coupling member surrounding said conduit member and bears on opposite sides against parts thereof and also bears against said coupling member so that its rotation produces relative longitudinal movements between one of said members and the other in both directions.

15. A hose coupler comprising a coupling member provided on one side with a lateral projection and on the other with a forwardly extending arm adapted to engage a mating coupler, a conduit member extending through said coupling member and formed with an enlargement at its outer end, and a revoluble cam ring surrounding said conduit member and interposed between the enlargement thereof and said coupling member and engaged with said members so that its rotation in opposite directions produces relative movements in opposite directions of one member with respect to the other.

16. A hose coupler comprising a coupling member, a conduit member which extends through said coupling member and is provided at its outer end with a pair of diametrically arranged lugs, a pair of diametrically arranged lugs on the coupling member at substantially right angles to the lugs of the conduit member, and a cam member interposed between said lugs.

17. A hose coupler comprising a coupling member, a conduit member which extends through said coupling member and is provided at its outer end with a pair of diametrically arranged lugs, a pair of diametrically arranged lugs on the coupling member at substantially right angles to the lugs of the conduit member, and a cam ring surrounding said conduit member and interposed between said pairs of lugs.

18. A hose coupler comprising a coupling member, a conduit member adapted to extend and be movable longitudinally through the coupling member and formed with an enlargement at the outer end for holding a gasket, a cam ring which surrounds said conduit member and bears against said enlargement, a lug on the conduit member which stands on the other side of the cam ring from said enlargement, and a web on the coupling member which stands in front of the cam ring.

19. A hose coupler comprising a coupling member, a conduit member adapted to extend and be movable longitudinally through the coupling member and formed with an enlargement at the outer end for holding a gasket, a cam ring which surrounds said conduit member and bears against said enlargement, a lug on the conduit member which stands on the other side of the cam ring from said enlargement, and a web on the coupling member which stands in front of the cam ring, said ring and web being slotted to permit the lug on the conduit member to pass said web and ring in assembling.

20. A hose coupler comprisng a coupling member, a conduit member adapted to extend and be movable longitudinally through the coupling member and formed with an enlargement at the outer end for holding a gasket, a cam ring which surrounds said conduit member and bears against said enlargement, a lug on the conduit member which stands on the other side of the cam ring from said enlargement, and a web on the coupling member which stands in front of the cam ring, said ring and web being slotted to permit the lug on the conduit member to pass said web and ring in assembling, the coupling member being formed with a recess to receive said lug.

21. A hose coupler comprising a coupling member, a conduit member adapted to extend and be movable longitudinally through the coupling member and formed with an enlargement at the outer end for holding a gasket, a cam ring which surrounds said conduit member and bears against said enlargement, a lug on the conduit member which stands on the other side of the cam ring from said enlargement, a web on the coupling which stands in front of the cam ring, said ring and web being slotted to permit the lug on the conduit member to pass said web and ring in assembling, and stop members on the cam ring and web, the one on the latter being removable, to keep the slot in the ring out of alinement with the slot in the web.

22. A hose coupler comprising a coupling member provided with a circular opening and formed with diametrically arranged lugs on its outer face, a conduit member adapted to project through the opening in the coupling member and formed with diametrically arranged lugs which stand at substantially right angles to the lugs on the coupler member, a cam ring surrounding said conduit member and interposed between the same and the outer face of the coupling member, a lug on the conduit member which stands on the opposite side of the cam ring from the other lugs on the conduit member, said coupling member being formed with a recess to receive said last mentioned lug, and a web on the coupling member which stands in front of the cam ring, said web and cam ring being formed with slots to permit said last mentioned lug and the lug adjacent thereto on the conduit member to pass the web and ring when the parts of the device are assembled.

23. A hose coupler comprising a coupling member provided with a circular opening and formed with diametrically arranged lugs on its outer face, a conduit member adapted to project through the opening in the coupling member and formed with diametrically arranged lugs which stand at substantially right angles to the lugs on the coupler member, a cam ring surrounding said conduit member and interposed between the same and the outer face of the coupling member, a lug on the conduit member which stands on the opposite side of the cam ring from the other lugs on the conduit member, said coupling member being formed with a recess to receive said last mentioned lug, and a web on the coupling member which stands in front of the cam ring, said web and cam ring being formed with slots to permit said last mentioned lug and the lug adjacent thereto on the conduit member to pass the web and ring when the parts of the device are assembled, said cam ring and web being provided with co-engaging stops, that of the web being removable, to limit the angular movement of the cam ring.

24. A hose coupler comprising a coupling member formed on one side with a cam lug, on the other side with a longitudinally projecting locking arm for engagement with a mating coupler and above said cam lug with a projection to act as a stop for the locking arm of said mating coupler, a conduit member movable with respect to said coupling member; and means for effecting a relative longitudinal movement as between said members.

25. A hose coupler comprising a coupling member formed on one side with a cam lug and on the other side with a longitudinally extending arm having an opening therein whereby the arm is adapted to engage a cam lug on a mating coupler, a conduit member movable longitudinally but non-rotatable with respect to said coupling member, and means for effecting a relative longitudinal movement as between said members.

26. A hose coupler comprising a coupling member formed on one side with a curved undercut cam lug and on the other side with a longitudinally projecting arm having an opening therein bounded on one side by a curved edge adapted to engage a curved cam lug on a mating coupler, a conduit member longitudinally movable with respect to the coupling member and means for effecting a relative movement between said members.

27. A hose coupler comprising a coupling member formed on one side with a cam lug and an outwardly projecting lug above said cam lug and on the other with a longitudinally projecting locking arm having an opening therein whereby said arm may engage a cam lug on a mating coupler, a conduit member movable with respect to said coupling member, and means for producing a relative movement between said conduit and coupling members.

28. A hose coupler comprising a conduit member, a coupling member provided with a lateral projection on one side thereof adapted to be engaged by a mating coupler, and a longitudinally extending rigid arm on the other side having an opening through which a lateral projection on said mating coupler is adapted to extend, and means for effecting a relative movement between said members which brings the conduit member into intimate contact with said other coupler.

29. A hose coupler comprising a conduit member a coupling member formed on one side with an under cut lug adapted to be engaged by a mating coupler, and on the other side with a longitudinally extending rigid arm having an opening providing an edge adapted to be engaged by an undercut lug on said mating coupler, and means for effecting a relative movement between said members which brings the conduit member into intimate contact with said other coupler.

30. A hose coupler comprising a conduit member, a coupling member longitudinally movable with respect thereto provided on one side thereof with a longitudinally projecting rigid locking arm having an opening bounded along the edge adjacent the end of the arm by a cam surface whereby the coupling member is adapted for engagement with a mating coupler, and means for effecting a relative movement between said members.

31. A hose coupler comprising a coupling member formed on one side thereof with a longitudinally extending rigid locking arm formed with an opening whereby the arm may engage a projection on a mating coupler, a conduit member movable longitudinally with respect to the coupling member and means for effecting a relative movement between said members.

32. A hose coupler comprising a coupling member formed on one side with an undercut cam lug and on the other side with a longitudinally projecting rigid locking arm formed with an opening adapted to engage an undercut cam lug on a mating coupler, a conduit member longitudinally movable with respect to said coupling member, and means for effecting a relative movement as between said members.

33. A hose coupler comprising a coupling member formed on one side with a cam lug and on the other with a rigid longitudinally projecting locking arm formed with an opening, the edge of which adjacent the end of the arm is in the form of a cam to engage the cam lug of a mating coupler, a conduit member longitudinally movable with respect to said coupling member, and means for effecting a relative movement as between said coupling and conduit members.

34. A hose coupler comprising a coupling member composed of a transverse body part formed with an opening and a longitudinally projecting locking arm, a conduit member extending through the opening in the coupling member and provided at its outer ends with gasket-holding means and with an enlargement, and a cam ring interposed between said enlargement and the body portion of the coupling member; the locking arm being formed with an opening adapted to engage the cam lug of a mating coupler, and the opposite side of the body portion of the coupling member being formed with a laterally projecting cam lug.

35. A hose coupler comprising a coupling member composed of a transverse body part formed with an opening, and a longitudinally projecting locking arm, a conduit member extending through the opening in the coupling member and provided at its outer ends with gasket-holding means and with an enlargement, and a cam ring interposed between said enlargement and the body portion of the coupling member; the locking arm being formed with an opening adapted to engage the cam lug of a mating coupler, the opposite side of the body portion of the coupling member being formed with a laterally projecting cam lug, and a fixed projection on the coupling member above said last named cam lug.

36. A hose coupler comprising a coupling member formed on one side with a cam lug adapted to be engaged by the locking arm of a mating coupler and with a fixed projection above said cam lug, a conduit member longitudinally movable with respect to the coupling member, and means for effecting a relative movement between said members.

37. A hose coupler comprising a coupling member formed on one side with a cam lug adapted to be engaged by the locking arm of a mating coupler, a conduit member longitudinally movable with respect to said coupling member, means for effecting a relative movement as between said members, and means for maintaining an effective engagement between the locking arm of the mating coupler and said cam lug comprising a locking arm on the said coupling member having an opening the edges of which are engaged by the cam lug on the mating coupler to hold said couplers in substantial alinement.

38. A coupler comprising a coupling member and a conduit member, the former having a locking arm formed with an opening bounded on one side by a curved edge adapted to be engaged by the cam lug of a Sewall type coupler, said coupling member and conduit member being longitudinally movable with respect to each other whereby the aforesaid couplers may be engaged without rocking movement, and means for forcing the meeting faces of said couplers together.

39. A coupler comprising a coupling member and a conduit member, the former having a locking arm formed with an opening bounded on one side by a curved edge adapted to be engaged by the cam lug of a Sewall type coupler, said coupling member and conduit member being longitudinally movable with respect to each other whereby the aforesaid couplers may be engaged without rocking movement, and means for forcing the meeting faces of said couplers together.

40. A coupler comprising a coupling member and a conduit member, the former having a locking arm formed with an opening bounded on one side by a curved edge adapted to be engaged by the cam lug of a Sewall type coupler, said coupling member and conduit member being longitudinally movable with respect to each other whereby the aforesaid couplers may be engaged without rocking movement, and means for forcing the meeting faces of said couplers together, said coupling member being formed on the side opposite its locking arm with a projection adapted to stand over the locking arm of the mating coupler.

41. A coupler comprising a coupling member and a conduit member, the former having a locking arm formed with an opening bounded on one side by a curved edge adapted to be engaged by the cam lug of a Sewall type coupler, said coupling member and conduit member being longitudinally movable with respect to each other whereby the aforesaid couplers may be engaged without rocking movement, and means for forcing the meeting faces of said couplers together, said opening in the locking arm being formed so that the aforesaid couplers when engaged are held in substantial alinement before their meeting faces are forced together.

42. A hose coupler comprising a coupling member adapted to mate with a coupler of the Sewall type, a conduit member adapted to extend and be longitudinally movable through the coupling and formed with an enlargement at its outer end, a cam element which seats against the outer face of said coupling member and bears against said enlargement, a lug on the conduit member which stands on the other side of the cam element, and a web on said coupling element which stands in front of the cam element, said cam element and web being formed to permit the lug on the conduit member to pass the web and cam element in assembling.

43. A hose coupler comprising a coupling member adapted to mate with a coupler of the Sewall type, a conduit member adapted to extend and be longitudinally movable through the coupling and formed with an enlargement at its outer end, a cam element which seats against the outer face of said coupling member and bears against said enlargement at diametrically opposite points, a lug on the conduit member which stands on the other side of the cam element, and a web on said coupling element which stands in front of the cam element, said cam element and web being formed to permit the lug on the conduit member to pass the web and cam element in assembling.

44. A hose coupler comprising a coupling member adapted to mate with a coupler of the Sewall type, a conduit member adapted to extend and be longitudinally movable through the coupling and formed with an enlargement at its outer end, a cam element which seats against the outer face of said coupling member and bears against said enlargement at diametrically opposite points, a lug on the conduit member which stands on the other side of the cam element and adapted to engage the coupling member so as to prevent relative rotational movement of said coupling and conduit member, and a web on said coupling element which stands in front of the cam element, said cam element and web being formed to permit the lug on the conduit member to pass the web and cam element in assembling.

45. A hose coupler comprising a coupling member provided with means for engaging a mating coupler, a conduit member extending movably and loosely through said coupling member and a wedging element interposed between the outer face of the coupling member and the conduit member which engages the conduit member at two diametrically opposite points only.

46. A hose coupler comprising a coupling member provided with means for engaging a mating coupler, a conduit member extending movably and loosely through said coupling member and formed at its outer end with a pair of diametrically arranged projections and a wedging element interposed between the outer face of the coupling member and said projections on the conduit member for imparting longitudinal movement to the latter.

47. A hose coupler comprising a coupling member provided with means for engaging the mating coupler, a conduit member extending movably and loosely through said coupling member and formed at its outer ends with a pair of diametrically arranged projections, and a cam ring surrounding the conduit member and bearing against the outer face of said coupling member and the projections on said conduit member for imparting longitudinal movements to the conduit member.

48. A hose coupler comprising a coupling member provided with means for engaging a mating coupler, a conduit member extending movably and loosely through said coupling member, the outer end of which is enlarged laterally, and a wedging element interposed between the outer face of the coupling member and the enlarged portion of the conduit member for imparting longitudinal movement to the conduit member.

EDWARD A. RUSSELL.
SEELYE P. HARRIMAN.